Feb. 23, 1954  F. H. REAM  2,670,223
PIPE COUPLING
Filed Aug. 25, 1950
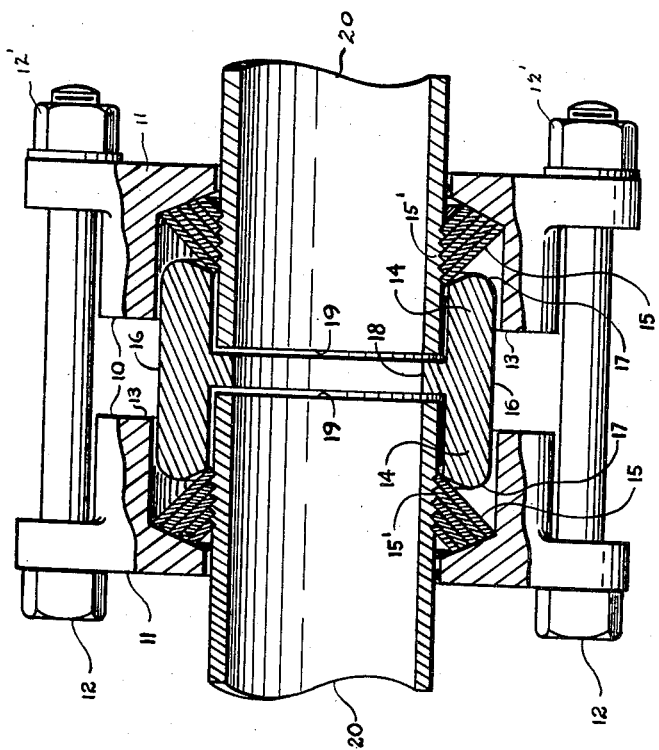
INVENTOR.
Fred H. Ream
BY Patented Feb. 23, 1954

2,670,223

UNITED STATES PATENT OFFICE 2,670,223

PIPE COUPLING

Fred H. Ream, Montgomery County, Ohio

Application August 25, 1950, Serial No. 181,489

1 Claim. (Cl. 285—193)

My invention relates to pipe connectors known to the trade as a pipe coupling. In my invention disclosed herein by specification and drawing I illustrate the use of a plurality of relatively thin, conical, hard metal elements which are forced into cutting contact with the surface of the pipe ends to be coupled together.

In the drawings:

Fig. 1 illustrates a cross-sectional view of my invention being used on two pipe ends.

Fig. 2 shows a partial sectional perspective view of several sealing elements.

In reference to the accompanying drawings made a part of this specification, as shown in Fig. 1, the numeral 10 indicates my whole coupling which comprises end brackets 11, through bolts 12, nuts 12', center ring 14, and sealing elements 15.

Although not shown herein it is contemplated that brackets 11 could also be adapted to be threaded and screwed onto ring 16 for tight coupling purposes.

Center ring 14 formed with circular outer ring 16 having rounded edges 17, an inner ring 18 against which ends 19 of pipes 20 are abutted for connection, provides a stop against which sealing elements 15 are forced into pressure contact.

When assembled, flange 13 of bracket 11 tightly encloses ring 16 and sealing elements 15 thus forming a tight coupling of pipes 20 in such a manner that by drawing up bolts 12 by a hand wrench or the like enough pressure will be exerted by brackets 11 on sealing elements 15 and edges 15' so as to cause edges 15' to cut into pipe surfaces as illustrated in Fig. 1 near the end portions of pipe 20, thereby securing a water and gas tight connection of pipes 20.

Since sealing elements 15, as shown in cross section in Fig. 1, are formed as portions of a hollow truncated cone it will be observed that the tendency of the edges 15' will be to bite into pipes 20 whenever sufficient force is exerted to slightly bend elements 15 against each other and against end 17 of ring 14.

It is contemplated as being within the scope of my invention to also use a single relatively long and narrow tapered width metal band as a wrap-around sealing element, not shown herein. The same novel features of an edge pipe cutting element as shown herein would be employed, as a substitute for conical shaped elements 15.

It is deemed unnecessary to show the same by a drawing, but it should be mentioned that such a substitute for elements 15 would permit my invention to be used on an existing pipe line which possessed a faulty joint. In such a use to effect a repair of a faulty joint the end brackets 11 would be modified by a mechanic skilled in the art to adjust said brackets around the respective pipe portions in order to secure a gas or liquid tight coupling.

Having described my invention, I claim:

In a pipe coupling device having as principal elements, a pair of pipe sections, a center aligning element, opposite end forcing elements provided with movable means and a plurality of pipe encircling rings, each of said rings being substantially frusto-conical in shape, graduated in external peripheral diameter, substantially uniform in internal peripheral diameter, and telescoped one within the other, the external peripheral edges of said telescoped frusto-conical rings defining a substantially continuous conical surface, the inner peripheral edges of said rings defining a stepped substantially cylindrical surface engaging said pipe sections in biting engagement, said pipe sections being embraced by said center aligning element and said end forcing elements, the conical surface of each of the largest of said rings abutting said center aligning element, said end elements each having a conical inner end surface engaging the substantially continuous conical surface formed by the external peripheral edges of said encircling rings substantially at right angles whereby upon movement by the movable means of the end forcing elements toward said center-aligning element, the stepped surface of said rings bites into the pipe surfaces imparting a longitudinal thrust to the said pipe sections and forcing them toward one another within said center-aligning element, said encircling rings in telescoped relation adapted to form a strut structure under compression.

FRED H. REAM.

References Cited in the file of this patent

UNITED STATES PATENTS

| Number | Name | Date |
|---|---|---|
| 887,859 | Smith | May 19, 1908 |
| 1,032,761 | Miller | July 16, 1912 |
| 1,840,312 | Dunmire | Jan. 12, 1932 |
| 2,444,380 | Shimek | June 29, 1948 |
| 2,474,880 | Woodling | July 5, 1949 |